Figure 1:
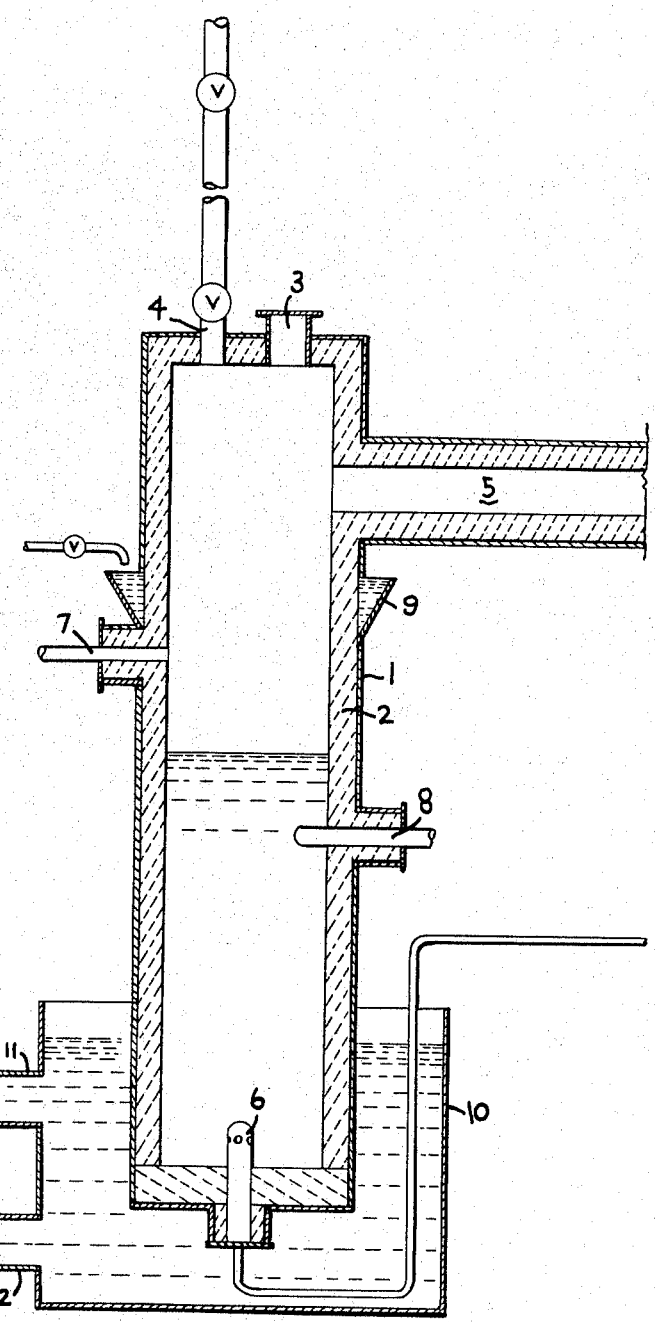

Sept. 12, 1967  D. CLEAVER ET AL  3,341,283
CHLORINATION OF ALUMINUM IN THE PRESENCE OF IRON
Original Filed March 25, 1964  2 Sheets-Sheet 1

INVENTOR.
DENIS CLEAVER and
BY JOHN DENNIS HERRIMAN

Oscar L. Spencer
ATTORNEY

Sept. 12, 1967  D. CLEAVER ET AL  3,341,283
CHLORINATION OF ALUMINUM IN THE PRESENCE OF IRON
Original Filed March 25, 1964  2 Sheets-Sheet 2

INVENTOR.
DENIS CLEAVER and
BY JOHN DENNIS HERRIMAN

Oscar L. Spencer
ATTORNEY

# 3,341,283
CHLORINATION OF ALUMINUM IN THE PRESENCE OF IRON Denis Cleaver, Saltburn, and John Dennis Herriman, Great Ayton, England, assignors to British Titan Products Company Limited, Durham, England, a corporation of the United Kingdom
Continuation of application Ser. No. 354,677, Mar. 25, 1964. This application May 16, 1966, Ser. No. 550,566
Claims priority, application Great Britain, Apr. 1, 1963, 13,994/62
10 Claims. (Cl. 23—93)

This application is a continuation of U.S. application Ser. No. 354,677, filed Mar. 25, 1964, now abandoned.

The present invention relates to a process for the production of aluminum trichloride of high purity.

It is desirable, when oxidising the vapour of a titanium tetrahalide, such as titanium tetrachloride, to pigmentary titanium dioxide to introduce into the oxidation a minor proportion (generally less than about 5% by weight on the $TiO_2$ produced) of aluminum trichloride vapour. By this means the quality of the pigmentary titanium dioxide produced, particularly its rutile content and tinting strength is improved. Where the oxidation is carried out in a fluidised bed of inert particles, aluminum trichloride together with silicon tetrachloride can be used in a special way to produce a softer accretion of titanium dioxide on the bed particles; such a process is described and claimed in our co-pending British application No. 26,192/60.

It is essential, however, that the aluminum trichloride introduced into such oxidations should be of high purity. Substantial amounts of impurities in the aluminum trichloride, particularly if consisting of metals forming coloured ions, cause deterioration of the pigmentary titanium dioxide, particularly in the colour of the product. Iron is a very common impurity of aluminum which forms a coloured ion.

It is an object of the present invention to provide a process which produces aluminum trichloride having an acceptably low iron content from aluminum which contains a substantial amount of iron as an impurity.

Accordingly, the present process comprises treating molten aluminum containing iron as an impurity with chlorine; contacting at an elevated temperature the metal chloride vapour thus formed with aluminum for a sufficient length of time to reduce the amount of iron in the vapour to less than 200, and preferably less than 100, parts of iron per million of vapour, and thereafter recovering aluminum trichloride vapour. All parts mentioned herein are by weight.

The molten aluminum containing iron is preferably contacted with chlorine in a reactor which is supplied with means for removing excess heat, for example, a jacket through which coolant can be circulated and/or by the provision of a film of a readily-vapourisable liquid such as water on the outside of the reactor. Alternatively, the molten aluminum in the reactor may be cooled by the apparatus and method described in our copending British application No. 44,019/62, utilising a cooled aluminum plug in the wall of the reactor. When it is desired to terminate the reaction, the cooling of the said plug, or preferably a smaller aluminum plug, may be stopped so that the plug will melt and allow the molten aluminum in the reactor to drain out into a suitable receptacle.

Such a reactor is conveniently supplied with a port for replenishing the molten aluminum; a port for the insertion of a gas poker or similar device for heating the aluminum initially and an exit for the aluminum trichloride vapour produced. Provision is also made for the injection of chlorine, as described later. If desired, a pocket for a temperature measuring device, such as a thermocouple, may also be provided through the wall of the reactor.

The reactor normally comprises a metal shell with a lining of material capable of resisting corrosion by the reactants and products, at the temperature of the reaction. The lining may, for example, consist of refractory concrete, Alundum or graphite.

The reactor is normally charged with solid aluminum (containing iron as an impurity) and this is initially heated, for example by the use of a gas poker as previously mentioned. Chlorine is then introduced preferably at the bottom of the reactor and the heat of reaction between chlorine and aluminum is sufficient to melt the metal and to maintain it in the molten state. It may be necessary to remove excess heat to maintain the melt in the desired temperature range, for example by the means previously described.

The chlorine may be introduced through any suitable device, for example through one or more pipes of resistant material which may be provided with means to break up and distribute the flow of gas such as porous plates or perforated tubes so that the chlorine intimately contacts the aluminum as it rises through the molten mass.

One device which has been found very satisfactory for introducing chlorine through the melt is an upright ceramic tube sealed at one end and having a number of horizontal holes in the sides. Chlorine is supplied to the open end of this tube. Alternatively, the chlorine may be introduced through downwardly slanted pipes such as are described and illustrated in our co-pending British application No. 44,019/62.

An alternative method of carrying out the present invention is to provide a substantially vertical column, containing packing, down which molten aluminum is run. Chlorine is introduced into the lower part of the column and rises countercurrent to the molten aluminum, reacting with the latter to form aluminum trichloride. The column is high enough so that the aluminum trichloride has an appreciable time of countercurrent contact with the molten aluminum before passing out of the top of the column, thereby being stripped of almost all its iron content. The molten aluminum may be recirculated from the bottom to the top of the column, heat and good insulation being provided as requisite to maintain the aluminum in the molten state. The aluminum trichloride recovered from the top of the column may be treated with additional chlorine if desired.

During the process of the present invention, it is preferred to maintain the temperature of the molten aluminum with which the chlorine is contacted at a value of at least 700° C. and preferably at a value in the range 800 to 1100° C.

In order to produce aluminum trichloride vapour with the desired low content of iron (i.e. less than 200 p.p.m. and preferably less than 100 p.p.m.), it is essential to contact the metal chloride vapour produced with aluminum for a sufficient length of time and at an elevated temperature to allow the iron chloride in the metal halide vapours to be reconverted to a non-volatile material, such as metallic iron. It is believed that the following type of reaction takes place:

$$FeCl_3 + Al \rightarrow Fe + AlCl_3$$

This reaction may be achieved by contacting the metal chloride vapour with a separate quantity of aluminum at a temperature of at least about 400° C. after the metal chloride vapour has left the melt in which it was formed. The aluminum with which the chloride vapour is contacted may be solid or molten, but is preferably molten.

It is preferred, however, to reduce the iron content to less than 200 p.p.m. (and preferably to less than 100 p.p.m.) before the metal chloride vapour leaves the molten aluminum in which it was formed. This can be achieved by correlating the rate of flow of chlorine into the molten aluminum with the depth of molten aluminum through which the metal chloride vapour must pass. The values will depend to some extent upon the temperature of the molten aluminum and upon the state of sub-division of the chlorine introduced to the reactor, but they can readily be determined for a particular reactor by varying the depth of molten aluminum and the rate of flow of chlorine and by measuring the iron content of the aluminum trichloride vapour leaving the molten aluminum. For example, in a reactor containing a depth of molten aluminum of 12 inches, and 3.5% by weight of iron in the molten aluminum, aluminum trichloride vapour containing less than 100 p.p.m. of iron was produced at chlorine flow rates in the range of about 10 to 15 lbs. per hour.

Where the chloride is removed in its passage through the molten aluminum in which it was formed, the chlorine should be utilised with an efficiency of at least 97% and preferably at least 99% during its passage through the molten aluminum, since the presence of a substantial amount of free chlorine in the vapour just before leaving the melt will lower the efficiency of the iron-stripping action of the molten aluminum, thus resulting in an iron content in the aluminum trichloride vapour in excess of 200 parts per million parts of vapour.

In fact, the process of the invention can be considered as being carried out in two zones. In the first zone the chlorine is used up substantially completely in its reaction with molten aluminum and iron impurity (and probably also with other impurities). In the second zone, iron chloride produced in the first zone reacts with aluminum, in the substantial absence of free chlorine, to ensure that the metal chloride vapour effluent from the second zone contains less than 200 parts of iron per million parts of the vapour.

The normal iron content of industrial aluminum such as is used in the process is in the range of about 0.05% to 0.5%. However, as the process proceeds with the preferential chlorination of aluminum according to the present process and with replenishment of the aluminum, the iron content of the molten aluminum increases, for example up to about 5% by weight or even up to 10% by weight. It is surprising that, by the present process aluminum trichloride vapour containing less than 200 p.p.m., and if desired less than 100 p.p.m., of iron can still be produced from molten aluminum containing such high concentrations of iron.

It has been found advantageous to inject chlorine into the aluminum trichloride vapour, after the latter has been contacted with aluminum to remove iron, since by this means any chlorides of aluminum lower than the trichloride, any aluminum vapour or any droplets of aluminum metal, are converted to the trichloride before leaving the reactor. (The presence of lower chlorides of aluminum is undesirable since they may undergo disproportionation to deposit metallic aluminum which may cause blocking of pipes through which the aluminum trichloride vapour passes.)

In order to complete the conversion of lower chlorides of aluminum to aluminum trichloride the chlorine should be injected into the metal chloride vapour before its temperature falls below 300° C. and preferably before it falls below 500° C. The presence of small amounts of unreacted chlorine is unimportant when the aluminum trichloride vapour is to be used in the vapour phase oxidation of a titanium tetrahalide.

It has also been found advantageous when closing down the reactor to discontinue the supply of chlorine before the aluminum has solidified in the reactor and to replace the chlorine with a stream of inert gas, for example nitrogen or argon. By this means the aluminum solidifies into a porous mass through which chlorine can be passed when the process is restarted. Thus it is not necessary to re-melt the aluminum to restart the reaction. The metal is heated to a temperature at which the chlorine will react and the heat of reaction will then re-melt the aluminum. It is preferable to heat the porous mass of aluminum to a temperature of at least about 200° C. before passing in the chlorine when restarting in order to ensure a rapid reaction between the chlorine and aluminum.

The aluminum trichloride vapour produced can be recovered by any suitable method, for example it can be condensed to solid aluminum trichloride or it can be transferred in the form of vapour directly to a process for the production of pigmentary titanium dioxide by the oxidation of a titanium tetrahalide. Where the aluminum trichloride is to be maintained in the vapour state, it should be transferred through pipes which are heated to a temperature of at least about 200° C. in order to prevent the formation of solid aluminum trichloride in these pipes.

The invention will be illustrated by reference to the accompanying drawings, the two figures of which are cross-sectional representations (not to scale) of two alternative forms of reactor. The following two examples illustrate the invention by reference respectively to these two figures.

*Example 1*

In FIGURE 1, a cylindrical steel shell 1 of 9 inches internal diameter having a refractory chlorine-resistant concrete lining 2 of 1 inch thickness forms the reactor. This is provided with a port 3 for the insertion of a gas poker (which can be closed when not in use) and an inlet port 4 sealed against the escape of aluminum trichloride for the introduction of solid aluminum rod during the reaction. An outlet port 5 for the withdrawal of aluminum trichloride and an injector 6 comprising a sealed ceramic tube having 4 holes in the side for the introduction of chlorine below the surface of the molten aluminum are also provided. These 4 holes are about one inch above the lining 2 at the bottom of the reactor. A means for injecting chlorine above the surface of the molten aluminum consists of an injector 7 passing through the wall of the reactor. A pocket 8 through the wall of the reactor into the molten aluminum is provided for a thermocouple.

About three-quarters of the distance from the base of the reactor to the top on the outside of the shell of the reactor there is provided a metal gutter 9 to which water is supplied. From this gutter 9 water overflows and runs down the outside of the shell thus providing a film of cooling liquid. The water collects in receptacle 10, which is fitted with inlet and outlet ports 11 and 12 and which provides a water bath for the lower half of the reactor.

In operation the reactor was charged with 50 lbs. of ingot aluminum cut into pieces approximately 4 x 2 x 2 inches and an oxygen/coal gas poker was inserted through the port 3 and the flame was played upon the aluminum pieces until a temperature of 400° C. was reached. The poker was removed and chlorine admitted through the injector 6 at a rate of 13.2 lbs. per hour. The aluminum melted to form a pool 12 inches deep in the reactor.

Over the first 30 minutes of the reaction the temperature rose from 400 to 900° C. and the rate of flow of chlorine was reduced to 11.2 lbs. per hour to maintain the molten aluminum at a temperature of about 1,000° C.

Aluminum rod of ¾ inch outside diameter was fed batchwise in 1.5 lbs. lots at a rate of 3 lbs. per hour through the port 4. The temperature varied between 950 and 1050° C. during the supply of the aluminum rod.

Water film cooling of the reactor shell 1 was used when the melt temperature was above 750° C.

During the reaction, chlorine was admitted to the injector 7 above the molten aluminum at a rate of 0.7 lb. per hour.

Aluminum trichloride was recovered from the effluent gases by condensing the aluminum trichloride vapour to a solid and the uncondensed gases were passed to a scrubbing column down which caustic soda was passing. Approximately 95% of the aluminum trichloride was recovered.

Calculations showed that more than 99% of the chlorine admitted into the molten aluminum was converted into aluminum trichloride.

The aluminum ingot and the rod used contained about 0.35% by weight of iron but the aluminum trichloride produced contained only 38 p.p.m. of iron when the iron content of the molten aluminum reached 1% and contained less than 100 p.p.m. when the iron content of the molten aluminum had risen to 3.5%, due to the preferential chlorination of the aluminum.

The aluminum trichloride produced, when analysed, showed an aluminum trichloride content in excess of 99.7%.

Experiments with the reactor described above were carried out in several stages of 6 hours. At the completion of each stage the chlorine was replaced by a flow of argon or nitrogen at a rate of 20 litres per minute before the molten aluminum solidified. A very porous solid mass of aluminum was formed in the reactor which had a very reactive centre which allowed initiation of the reaction by admitting chlorine after heating the solid charge to a temperature of about 200° C. with a gas poker.

*Example 2*

Figure 2:
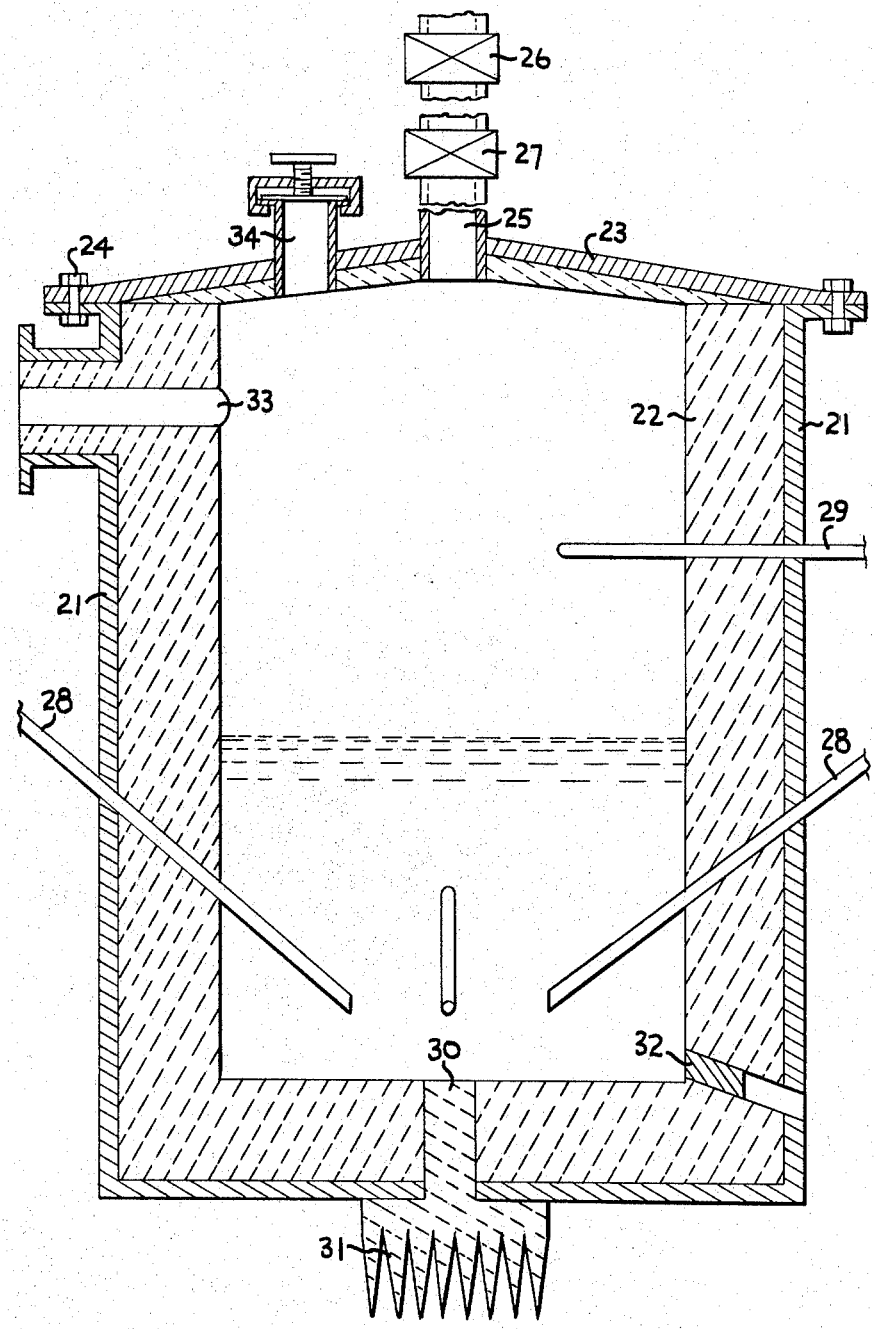

In FIGURE 2, a container is formed from a steel shell 21 of 33 inches diameter lined with a refractory concrete 22 9 inches thick and having a removable top 23 similarly lined and secured by bolts 24 to the lower part of the container.

The top 23 of the container is provided with a supply device consisting of a pipe 25 of 3 inches internal diameter having two valves 26 and 27 46 inches apart along the pipe.

The container is also provided with four downwardly-slanting chlorine inlet pipes 28 of 0.25 inch internal diameter, three of which are supplied from a common manifold (not shown) and the fourth (not shown) from a separate supply with controlling valve (not shown). The three former inlet pipes terminate about 2 inches above the lining 22 at the bottom of the reactor. The latter inlet pipe is provided so that the pressure drop of chlorine across the molten aluminum can be determined, thus indicating how much molten aluminum is present in the container. An additional inlet pipe 29 is provided to inject chlorine above the molten aluminum.

In the bottom of the container is an aluminum plug 30 which is of 3½ inches square cross-section within the wall of the container and which is expanded to 6½ inches square cross-section outside the wall of the container. The expanded end is formed into fins 31, the total area of the fins being about 72 square inches, over which air is blown by a fan (not shown). An aluminum drain plug 32 is also provided in the wall of the container and the exterior end of this plug is cooled by a variable air blast from a compressor (not shown) during the chlorination.

The container is also provided with an outlet 33 for the reaction products.

The container is also provided with a port 34 through which a gas poker may be inserted to heat the contents to reaction temperature.

When the apparatus is to be used, a charge of about 70 lbs. of broken aluminum ingots of a size of about 0.5 inch to 2 inches is introduced through the pipe 25, and this charge is heated by means of a gas poker introduced through the port 34 to a temperature of about 450° C., after which the valves are closed. Chlorine is then introduced through the lower inlet pipes 28 at a total rate of about 2 cubic feet per minute. Chlorine is also introduced through the inlet pipe 29 at a rate of about 0.3 cubic foot per minute.

As the chlorination proceeds the temperature in the container rises and the aluminum melts to provide a molten bath of about 33 inches deep. The air blast over the fins 31 is commenced. The temperature of the molten aluminum in the container is normally maintained at about 900° C. during the chlorination by means of the cooled plug 30.

When further aluminum is to be introduced into the container during chlorination it is placed in the pipe 25 and the upper valve 26 is opened to allow the aluminum to pass into the part of the pipe 25 which lies between the valves 26 and 27. The upper valve 26 is then closed and the lower valve 27 opened, thus allowing the aluminum to pass into the container without escape of chlorine or aluminum trichloride to the atmosphere.

Under the conditions described the apparatus is capable of producing about 30 lbs. of aluminum trichloride per hour and the temperature of the molten aluminum is readily controlled.

The aluminum added to the reactor contains 0.1% iron, and the aluminum trichloride recovered from the process contains about 10 p.p.m. of iron.

What is claimed is:

1. A process for purifying vaporous aluminum trichloride containing iron as an impurity in excess of 200 parts per million by weight which comprises intimately contacting in the absence of substantial free chlorine said contaminated vaporous aluminum chloride with molten aluminum metal at a temperature of at least 700° C. to effect reaction between said molten aluminum metal and said iron impurity whereby said iron impurity is converted to a non-volatile state under the conditions of said contacting and separating aluminum chloride vapors containing less than 100 parts per million by weight of iron impurity from the molten aluminum metal.

2. A process in accordance with claim 1 in which said separated aluminum chloride vapor is mixed with chlorine while said vapors are at a temperature of at least 300° C. whereby entrained aluminum vapor and subvalent aluminum chlorides are converted to aluminum trichloride.

3. A process in accordance with claim 1 in which said contaminated aluminum trichloride vapors are produced by passing gaseous chlorine through a bath of molten aluminum metal with substantially complete consumption of said chlorine and the resulting iron-contaminated, vaporous aluminum trichloride is employed as the feed for the process step of claim 1.

4. A process in accordance with claim 3 in which said molten aluminum metal in the iron removal step flows in countercurrent relation to the aluminum chloride vapors being treated.

5. A process in accordance with claim 4 in which molten aluminum metal from said iron removal step is passed as feed to said chlorination step in countercurrent relation to the flow of vaporous aluminum trichloride produced in said reaction step.

6. A process for the production of vaporous aluminum trichloride from iron-contaminated aluminum which comprises the steps of:
  (a) providing first and second molten aluminum contacting zones maintained at a temperature of at least 700° C.;
  (b) introducing gaseous chlorine and iron-contaminated molten aluminum into said first molten aluminum contacting zone and effecting reaction therebetween to produce aluminum trichloride vapors containing iron as an impurity in excess of 200 parts per million by weight, said gaseous chlorine being substantially completely consumed in said first molten aluminum contacting zone;
  (c) passing said iron-contaminated aluminum trichloride vapors from step (b) into intimate contact with molten aluminum in said second molten aluminum contacting zone;

(d) stripping iron impurities from said vapors with said molten aluminum in said second molten aluminum contacting zone;

(e) separating aluminum chloride vapors containing less than 100 parts per million by weight iron impurity from said molten aluminum in said second molten aluminum contacting zone; and (f) mixing said aluminum chloride vapors from step (e) with chlorine while said vapors are at a temperature of at least 300° C. whereby entrained aluminum vapor and subvalent aluminum chlorides are converted to aluminum trichloride.

7. A process in accordance with claim 6 in which the molten aluminum in said second aluminum contacting zone flows through said contacting zone in countercurrent relation with the flow of aluminum trichloride vapors being treated therein.

8. A process in accordance with claim 7 in which said molten aluminum in said first molten aluminum contacting zone flows in countercurrent relation with the chlorine in said contacting zone.

9. A process in accordance with claim 8 in which said first and second molten aluminum contacting zones are contiguous to define a single column of molten aluminum.

10. A process in accordance with claim 9 which is operated continuously with molten aluminum withdrawn from said first molten aluminum contacting zone being recycled as feed to said second molten aluminum contacting zone.

References Cited

UNITED STATES PATENTS

| | | | |
|---|---|---|---|
| 409,668 | 8/1889 | Castner | 23—93 |
| 1,165,065 | 12/1915 | Brooks | 23—93 |
| 1,645,143 | 10/1927 | Humphrey et al. | 23—93 |
| 1,734,200 | 11/1929 | Buley et al. | 23—93 X |
| 1,914,335 | 6/1933 | Winter et al. | 23—93 |
| 2,387,228 | 10/1945 | Arnold | 23—93 |
| 2,502,327 | 3/1950 | Krchma | 23—93 X |
| 2,768,070 | 10/1956 | Brazaitis | 23—93 X |
| 2,843,455 | 7/1958 | Pardee | 23—93 |
| 3,052,518 | 9/1962 | Frey | 23—93 |
| 3,078,145 | 2/1963 | Gayol | 23—93 |
| 3,152,864 | 10/1964 | Derham | 23—93 |

OSCAR R. VERTIZ, *Primary Examiner.*

EDWARD STERN, *Examiner.*